(12) United States Patent
Sato et al.

(10) Patent No.: US 8,404,327 B2
(45) Date of Patent: Mar. 26, 2013

(54) HONEYCOMB STRUCTURE

(75) Inventors: Fumiharu Sato, Nagoya (JP); Takuya Hiramatsu, Nagoya (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 293 days.

(21) Appl. No.: 12/476,296

(22) Filed: Jun. 2, 2009

(65) Prior Publication Data

US 2010/0003453 A1   Jan. 7, 2010

(30) Foreign Application Priority Data

Jul. 3, 2008   (JP) ................................. 2008-174845

(51) Int. Cl.
*B32B 3/12*   (2006.01)

(52) U.S. Cl. ......................................................... 428/116

(58) Field of Classification Search ........... 428/116–118
See application file for complete search history.

(56) References Cited

U.S. PATENT DOCUMENTS

| | | | |
|---|---|---|---|
| 2,601,352 A | | 6/1952 | Wolter |
| 2,892,797 A | | 6/1959 | Alexander et al. |
| 4,335,783 A | | 6/1982 | McBrayer et al. |
| 5,332,699 A | * | 7/1994 | Olds et al. ........................ 501/36 |
| 2003/0072914 A1 | | 4/2003 | Tanaka et al. |
| 2005/0272602 A1 | | 12/2005 | Ninomiya |
| 2009/0004431 A1 | | 1/2009 | Ninomiya |
| 2009/0011178 A1 | * | 1/2009 | Masukawa et al. ........... 428/116 |

FOREIGN PATENT DOCUMENTS

| | | |
|---|---|---|
| JP | B-51-44713 | 11/1976 |
| JP | B2-2604876 | 4/1997 |
| JP | A-2000-279729 | 10/2000 |
| JP | A-2003-105662 | 4/2003 |
| WO | WO 2005/110578 A1 | 11/2005 |
| WO | WO 2007119407 A1 * | 10/2007 |

\* cited by examiner

*Primary Examiner* — David Sample
(74) *Attorney, Agent, or Firm* — Oliff & Berridge, PLC

(57) ABSTRACT

A honeycomb structure includes: a periphery-ground article obtained by grinding an outer peripheral portion of a cell structure 3 where honeycomb segments 11 are bonded by a bonding layer 12 at an outer wall 10 of each of them, and an outer peripheral coat layer 9 disposed on an outer peripheral face 8 of the periphery-ground article; wherein at least one of the bonding layer 12 and the outer peripheral coat layer 9 is formed using honeycomb-forming slurry containing biologically soluble fibers containing a metal oxide capable of extricating a metal ion and an inorganic binder containing a colloidal oxide having modified silica sol manufactured by adding a substance containing amine or an aqueous solution of a water-soluble metalate of an amphoteric metal to silica sol. Crack generation of the outer peripheral coat layer and/or deterioration of bonding strength of the bonding layer can be inhibited.

8 Claims, 2 Drawing Sheets

HONEYCOMB STRUCTURE

BACKGROUND OF THE INVENTION AND RELATED ART

The present invention relates to a honeycomb structure. More specifically, the present invention relates to a honeycomb structure capable of inhibiting crack generation of the outer peripheral coat layer and/or deterioration in bonding strength of the bonding layer containing biologically soluble fibers can be inhibited, and a honeycomb structure capable of inhibiting crack generation of the outer peripheral coat layer.

In order to trap particulate matter such as dust contained in automobile exhaust gas or incineration exhaust gas generating upon incineration of waste, a honeycomb filter of a ceramic honeycomb structure is used. In particular, in order to efficiently remove particulate matter (hereinbelow sometimes referred to as "PM") such as soot discharged from an internal combustion engine, a diesel particulate filter (hereinbelow sometimes referred to as "DPF") is used.

In the DPF, since clogging is finally caused if the trapped PM is not removed, it is necessary to regenerate the DPF by removing the trapped PM. The DPF can be regenerated generally by combusting PM by heating the DPF itself. As a DPF regeneration method, there is, for example, a method where an oxidation type catalyst is loaded on the DPF to efficiently combust PM by high-temperature exhaust gas generating in a diesel engine. However, in the case of regenerating a DPF by heating, temperature distribution in the honeycomb structure becomes uneven by rapid temperature change of exhaust gas or local heat generation, and there arises a problem of crack generation or the like. To solve the problem, there has been disclosed a honeycomb structure of a bonded article where a plurality of honeycomb segments are bonded together at an outer wall of each of them (see, e.g., U.S. Pat. No. 4,335,783).

In addition, a honeycomb structure having such structural characteristics generally has a problem of low mechanical strength because of thin partition walls and high porosity. Therefore, mechanical strength is improved particularly in a large-sized honeycomb structure. For example, there has been disclosed a honeycomb structure, where the outer peripheral portion of the bonded article obtained by bonding a plurality of honeycomb segments at an outer periphery of each of them with a bonding material is subjected to grinding to arrange an outer peripheral coat layer of an outer peripheral coat material on the outer peripheral face (see, e.g., JP-B-51-44713).

Such a bonding material and an outer peripheral coat material generally contain inorganic particles such as a cordierite powder and silicon carbide particles and an inorganic binder such as silica sol and alumina sol. There is a case of further containing ceramic fibers as necessary. In particular, in recent years, there has been disclosed a honeycomb structure using a bonding material or an outer peripheral coat material containing biologically soluble fibers in consideration of influences on the human body (see, e.g., JP-A-2003-105662).

However, in a bonding material or an outer peripheral coat material containing biologically soluble fibers, there is a case that characteristics such as flowability are changed with the passage of time due to a metal ion extricated from the biologically soluble fibers and the resultant rise in pH. When a honeycomb structure is manufactured by the use of such a bonding material or an outer peripheral coat material having changed characteristics, bonding strength in a bonded portion may be deteriorated, or a crack may be generated in the outer peripheral coat layer.

SUMMARY OF THE INVENTION

The present invention has been made in view of such problems of the prior art and aims to provide a honeycomb structure (hereinbelow sometimes referred to as the "first honeycomb structure") capable of inhibiting crack generation in the outer peripheral coat layer formed by the use of slurry containing biologically soluble fibers and/or capable of inhibiting deterioration in bonding strength of the bonding layer formed by the use of slurry containing biologically soluble fibers.

The present invention also aims to provide a honeycomb structure (hereinbelow sometimes referred to as the "second honeycomb structure") capable of inhibiting crack generation in the outer peripheral coat layer formed by the use of slurry containing biologically soluble fibers.

As the result of keen study by the present inventors in order to solve the above problems, it was found out that the above problems can be solved by using honeycomb-forming slurry containing a predetermined constituent, which led to the completion of the present invention.

That is, according to the present invention, the following honeycomb structure can be provided.

[1] A honeycomb structure comprising: a periphery-ground article obtained by grinding an outer peripheral portion of a cell structure where a plurality of honeycomb segments are bonded by means of a bonding layer at an outer wall of each of them, and an outer peripheral coat layer disposed on an outer peripheral face of the periphery-ground article; wherein at least one of the bonding layer and the outer peripheral coat layer is formed by the use of honeycomb-forming slurry containing biologically soluble fibers containing a metal oxide capable of extricating a metal ion and an inorganic binder containing a colloidal oxide having modified silica sol, the modified silica sol being manufactured by adding a substance containing amine or an aqueous solution of a water-soluble metalate of an amphoteric metal to silica sol.

[2] A honeycomb structure comprising: a periphery-ground article formed by grinding an outer peripheral portion of a cell structure having a plurality of cells separated and formed by porous partition walls, and an outer peripheral coat layer disposed on an outer peripheral face of the periphery-ground article; wherein the outer peripheral coat layer is formed by the use of honeycomb-forming slurry containing biologically soluble fibers containing a metal oxide capable of extricating a metal ion and an inorganic binder containing a colloidal oxide having modified silica sol, the modified silica sol being manufactured by adding a substance containing amine or an aqueous solution of a water-soluble metalate of an amphoteric metal to silica sol.

[3] The honeycomb structure according to the above [1] or [2], wherein the inorganic binder has a pH value of 4 to 11 at 25° C.

[4] The honeycomb structure according to any one of the above [1] to [3], wherein a silica solid content of the modified silica sol has an average particle diameter of 10 to 80 nm.

The first honeycomb structure of the present invention exhibits the effect of inhibiting crack generation in the outer peripheral coat layer formed by the use of slurry containing biologically soluble fibers and/or the effect of inhibiting deterioration in bonding strength of the bonding layer formed by the use of slurry containing biologically soluble fibers.

The second honeycomb structure of the present invention exhibits the effect of inhibiting crack generation in the outer peripheral coat layer formed by the use of slurry containing biologically soluble fibers.

REFERENCE NUMERALS

1: first honeycomb structure, 2: second honeycomb structure, 3, 13: cell structure, 4, 14: cell, 5, 15: partition wall, 6: one end face, 7: the other end face, 8, 18: outer peripheral face, 9: outer peripheral coat layer, 10: outer wall, 11: honeycomb segment, 12: bonding layer, 20: disposition jig, 21: first plane, 22: second plane, 23: pad

DETAILED DESCRIPTION OF THE INVENTION

Hereinbelow, the best embodiment of the present invention will be described. However, the present invention is not limited to the following embodiment, and it should be understood that the present invention includes also an embodiment obtained by suitably adding changes, improvements, or the like to the following embodiment on the basis of general knowledge of those skilled in the art within the range of not deviating from the gist of the present invention.

The first honeycomb structure of the present invention is provided with a periphery-ground article obtained by grinding an outer peripheral portion of a cell structure where a plurality of honeycomb segments are bonded by means of a bonding layer at an outer wall of each of them and an outer peripheral coat layer disposed on the outer peripheral face of the periphery-ground article. At least one of the bonding layer and the outer peripheral coat layer is formed by the use of honeycomb-forming slurry containing biologically soluble fibers containing a metal oxide capable of extricating a metal ion and an inorganic binder containing a colloidal oxide having modified silica sol, and the modified silica sol is manufactured by adding a substance containing amine or an aqueous solution of a water-soluble metalate of an amphoteric metal to silica sol.

In addition, the second honeycomb structure of the present invention is provided with a periphery-ground article formed by grinding an outer peripheral portion of a cell structure having a plurality of cells separated and formed by porous partition walls and an outer peripheral coat layer disposed on the outer peripheral face of the periphery-ground article. The outer peripheral coat layer is formed by the use of honeycomb-forming slurry containing biologically soluble fibers containing a metal oxide capable of extricating a metal ion and an inorganic binder containing a colloidal oxide having modified silica sol, and the modified silica sol is manufactured by adding a substance containing amine or an aqueous solution of a water-soluble metalate of an amphoteric metal to silica sol.

Figure 1:
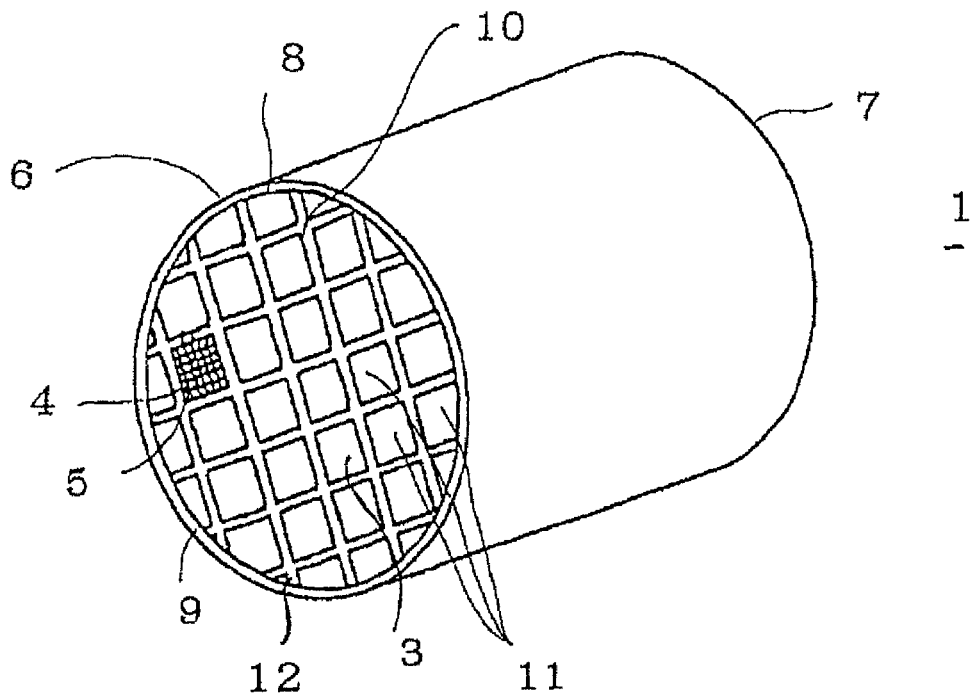
FIG. 1 is a perspective view showing an embodiment of the first honeycomb structure of the present invention.
Figure 2:
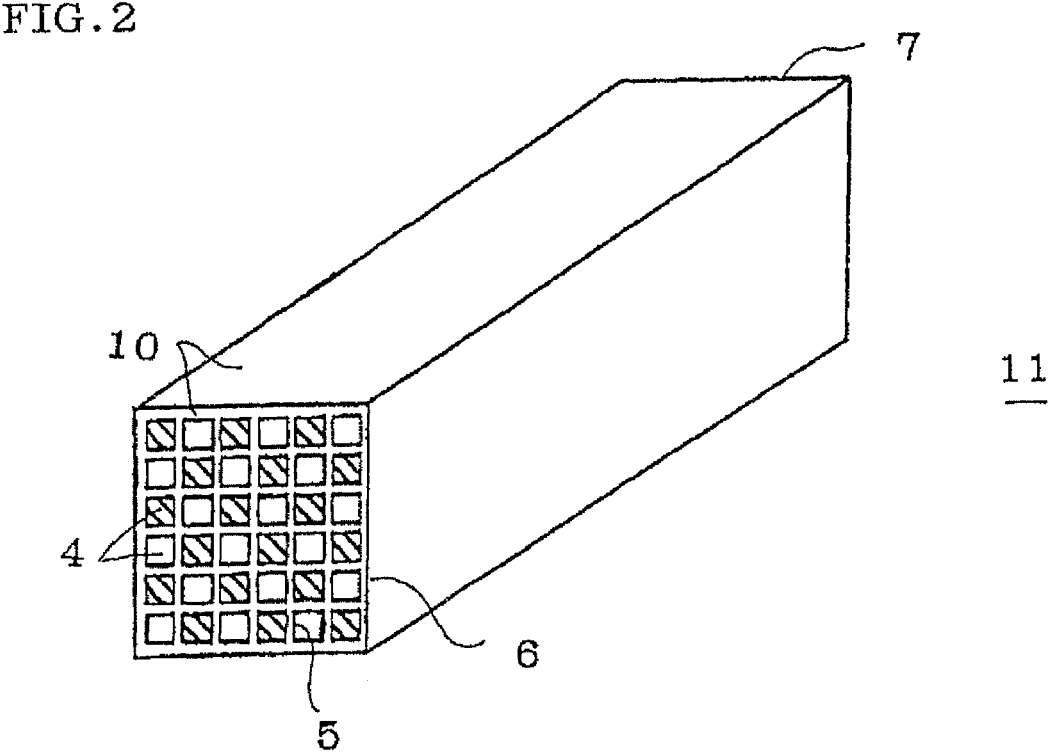
FIG. 2 is a perspective view schematically showing an example of a honeycomb segment constituting the first honeycomb structure of the present invention.

Here, a honeycomb structure of the present invention will be described with referring to drawings. FIG. 1 is a perspective view showing an embodiment of the first honeycomb structure of the present invention, and FIG. 2 is a perspective view schematically showing an example of a honeycomb segment constituting the first honeycomb structure of the present invention. In FIG. 1, the honeycomb structure 1 is provided with a periphery-ground article obtained by grinding an outer peripheral portion of a cell structure 3 and an outer peripheral coat layer 9 disposed on the outer peripheral face 8 of the periphery-ground article. The cell structure 3 is provided with a plurality of honeycomb segments 11 having an outer wall 10 and formed by a bonded article obtained by bonding the honeycomb segments 11 by means of a bonding layer 12 at an outer wall 10 of each of adjacent honeycomb segments 11. Incidentally, in FIG. 1, the honeycomb structure 1 has a columnar shape. However, the shape of the first honeycomb structure of the present invention is not limited to a columnar shape, and the shape may suitably be selected as necessary.

In FIG. 2, the honeycomb segment 11 has a plurality of cells 4 separated and formed by the porous partition walls 5 and the outer wall 10 in the outer periphery thereof. The cells 4 have plugging portions formed in such a manner that one end face 6 and the other end face 7 show complementary checkerwise patterns. Incidentally, in FIG. 2, the honeycomb segment 11 has a prismatic columnar shape. However, the shape of the honeycomb segment is not limited to the prismatic columnar shape, and the shape may suitably be selected as necessary.

Figure 3:
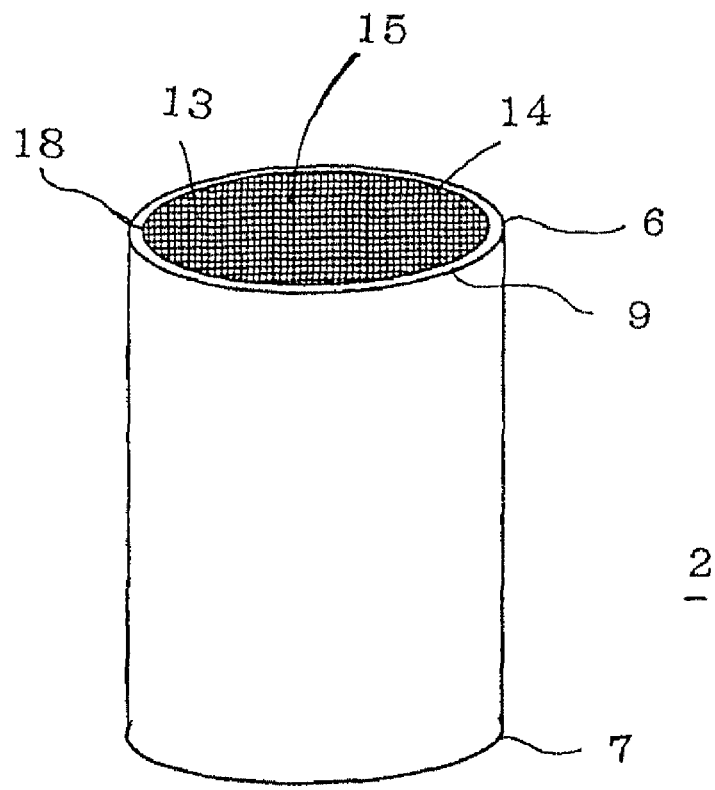
FIG. 3 is a perspective view showing an embodiment of the second honeycomb structure of the present invention.

FIG. 3 is a perspective view showing an embodiment of the second honeycomb structure of the present invention. In FIG. 3, the honeycomb structure 2 is provided with a periphery-ground article formed by grinding the outer peripheral portion of the cell structure 13 and an outer peripheral coat layer 9 disposed on the outer peripheral face 18 of the periphery-ground article. The cell structure 13 has a plurality of cells 14 separated and formed by porous partition walls 15, and the cells 14 are plugged in such a manner that one end face 6 and the other end face 7 show complementary checkerwise patterns.

Incidentally, in FIG. 3, the honeycomb structure 2 has a columnar shape. However, the shape of the second honeycomb structure of the present invention is not limited to the columnar shape, and the shape may suitably be selected as necessary.

I. First Honeycomb Structure

1. Constituent of the First Honeycomb Structure

The first honeycomb structure is provided with a periphery-ground article obtained by grinding an outer peripheral portion of a cell structure where a plurality of honeycomb segments are bonded by means of a bonding layer at an outer wall of each of them and an outer peripheral coat layer.

1.1 Periphery-Ground Article

The periphery-ground article is obtained by grinding an outer peripheral portion of the cell structure 3. The shape of the outer peripheral portion due to grinding is not particularly limited and may arbitrarily be formed in accordance with the shape of the first honeycomb structure. Incidentally, the outer peripheral portion to be ground is preferably for two cells or more from the outermost peripheral cell, more preferably for to 2 or 4 cells. By grinding the cell structure 3 in this manner, deformed cells present in the outer peripheral portion can be removed.

(Cell Structure)

The cell structure 3 is formed by bonding the honeycomb segments 11 at the outer wall 10 of each of them with a bonding layer. In the case of regenerating the DPF by heating, such formation of the cell structure 3 can inhibit crack generation in the DPF due to uneven temperature distribution in the honeycomb structure caused by rapid temperature change of exhaust gas or local heat generation. Incidentally, the number of the honeycomb segments 11 to be bonded is not particularly limited. However, it is generally about 2 to 100.

The cell structure 3 has a cell density of preferably 50 to 400 cpsi (7.7 to 62.0 cells/cm$^2$), more preferably 70 to 370 cpsi (10.8 to 57.3 cells/cm$^2$), particularly preferably 80 to 320 cpsi (12.4 to 49.6 cells/cm$^2$). When the cell density is below 50 cpsi (7.7 cells/cm$^2$), the strength may be low. On the other hand, when it is above 400 cpsi (62.0 cells/cm$^2$), the engine output may be reduced due to too high pressure loss.

(1) Honeycomb Segment

The honeycomb segment 11 has a plurality of cells 4 separated and formed by the porous partition walls 5 and an outer wall 10 in the outer periphery. The cells 4 separated and formed by porous partition walls 5 communicate between two end faces of the honeycomb segment 11 to function as fluid passages.

(i) Porous Partition Wall

It is preferable that the material constituting the porous partition walls 5 has an average pore diameter of 5 to 40 μm and a porosity of 30 to 85%. More specifically, the material is at least one kind selected from the group consisting of silicon carbide (SiC), a silicon-silicon carbide based composite material using silicon carbide (SiC) as the framework and silicon (Si) as the bonding material, silicon nitride, cordierite, mullite, alumina, spinel, silicon carbide-cordierite based composite material, lithium aluminum silicate, aluminum titanate, and Fe—Cr—Al based metal from the viewpoint of strength and thermal resistance. Of these, silicon or a silicon-silicon carbide based composite material is further preferable. When a honeycomb structure is manufactured by the use of porous partition walls 5 of a silicon-silicon carbide based composite material, generally, a silicon dioxide film is formed on the surface of silicon-silicon carbide. Since the melting point of silicon dioxide is higher than that of silicon, partition walls 5 can be inhibited from melting by the silicon dioxide surface protection film even in the case that the temperature of the honeycomb structure rises and exceeds the melting point of silicon. Incidentally, the average pore diameter is measured by a method in "the whole pore capacity and median pore diameter described in 6.3 of a test method M505-87 for an automobile exhaust gas purification catalyst ceramic monolith carrier of JASO (Japanese Automobile Standards Organization)", and the porosity is calculated from the pore capacity.

The thickness of the porous partition wall 5 is preferably 6 to 70 mil (0.015 to 0.177 cm), more preferably 8 to 30 mil (0.020 to 0.076cm), particularly preferably 10 to 20 mil (0.025 to 0.050 cm). When it is below 6 mil (0.015 cm), strength may be low. On the other hand, when it is above 70 mil (0.177 cm), the engine output may be reduced due to too high pressure loss.

A catalyst is preferably loaded on the porous partition walls 5. Loading of a catalyst on the porous partition walls 5 enables to effectively remove PM when the DPF is regenerated by heating.

There is no particular limitation on the catalyst as long as PM can be combusted by heat of exhaust gas. For example, an elementary substance selected from the noble metal elements, the elements in the group VIa of the periodic table, and the elements in the group VIII of the periodic table, or a compound thereof can be used. More specifically, a simple substance or a compound containing an element such as platinum (Pt), palladium (Pd), rhodium (Rh), nickel (Ni) cobalt (Co), molybdenum (Mo), tungsten (W), cerium (Ce), Copper (Cu), vanadium (V), iron (Fe), gold (Au), and silver (Ag). In addition, a NOx selective reduction catalyst component or a NOx adsorber catalyst component may be used.

The concentration of the catalyst loaded on the partition walls 5 is preferably 5 to 250 g/L, more preferably 10 to 100 g/L, particularly preferably 15 to 50 g/L. When the concentration of the catalyst is below 5 g/L, there is a case that PM cannot be combusted and removed sufficiently. On the other hand, when the concentration of the catalyst is above 250 g/L, pressure loss may extremely increase, or the costs may be high. Incidentally, the concentration of the catalyst can be calculated by cutting out a block having a certain volume from a honeycomb filter and dividing the mass difference before and after loading of the catalyst by the volume.

(ii) Cell

The cells 4 of the honeycomb segment 11 are separated and formed by the porous partition walls 5, and plugging portions are formed in such a manner that one end face 6 and the other end face 7 show complementary checkerwise patterns. By such plugging in the cells 4, when a fluid flows inside the DPF, the fluid does not pass through the communicating space between the end faces and has to pass through the porous partition walls 5 at least once. When the fluid passes through the porous partition walls 5, PM contained in the fluid is removed.

(2) Bonding Layer

The bonding layer 12 may be formed by the use of conventionally known bonding material slurry. However, it is preferably formed by the use of honeycomb-forming slurry. This is because the deterioration in bonding strength of the bonding layer 12 can be inhibited. Incidentally, the honeycomb-forming slurry may contain conventionally known bonding material slurry.

(Honeycomb-Forming Slurry)

The honeycomb-forming slurry contains biologically soluble fibers containing a metal oxide capable of extricating a metal ion and an inorganic binder containing a colloidal oxide having modified silica sol. In addition, the slurry may contain an inorganic particle component, an organic binder, or the like, as necessary. Incidentally, the "modified silica sol" means silica sol manufactured by adding a substance containing amine or an aqueous solution of a water-soluble metalate of an amphoteric metal to silica sol.

(i) Biologically Soluble Fiber

Generally, a "biologically soluble fiber" means a fiber soluble or substantially soluble in a physiological liquid within about one year. In particular, a "biologically soluble fiber" in the present specification means a fiber nondurable in a physiological liquid and excluded from the regulation of the classification for cancerogenesis. Examples of the physiological liquid include normal saline (0.9 mass % sodium chloride aqueous solution), a buffer solution, pseudo body fluid, and serum. The pseudo body fluid is an aqueous solution having a component almost the same as a human plasma component. Incidentally, "substantially soluble" here means that at least about 75 mass % is soluble.

The "fiber" means a material having a length larger than the width (or diameter). In a specific embodiment, the fiber may suitably be selected according to the purpose from fibers having a length of at least five times the diameter, at least 10 times, at least 100 times, and the like.

The biologically soluble fiber includes metal oxides such as $Na_2O$, $K_2O$, $CaO$, $MgO$, $P_2O_5$, $Li_2O$, $BaO$, and a combination of these and silica. Though the biologically soluble fiber may contain other metal oxides or other ceramic components, such metal oxides and ceramic components do not have desired solubility, and the amount should be small enough for the biologically soluble fibers to be substantially soluble in the physiological liquid. Examples of such metal oxides include $Al_2O_3$, $TiO_2$, $ZrO_2$, $B_2O_3$, and $Fe_2O_3$. The biologically soluble fiber may contain a metal component at a sufficiently small amount where the fiber is substantially soluble in a physiological liquid.

The biologically soluble fiber has a silica content of preferably 60 mass % or more, more preferably 65 to 95 mass %. The biologically soluble fiber having such a composition is preferable for immobilizing the fiber, exhibiting sufficient strength, and imparting thermal resistance.

In addition, the biologically soluble fiber has an alkali metal oxide content of preferably 2 mass % or less. Here, examples of the alkali metal oxide include $Na_2O$ and $K_2O$. When the alkali metal oxide content is 2 mass % or less, deterioration in strength of the bonding material or the outer peripheral coat material can be inhibited upon use at high temperature, for example, at 1200° C. or more.

An example of the biologically soluble fiber contains, for example, silica and magnesia, or silica, magnesia and calcia. Such a fiber is generally called as a magnesium silicate fiber or a calcium magnesium silicate fiber.

An example of the biologically soluble fiber is marketed with a trade name of "SUPERWOOL" produced by Shinnikka Thermal Ceramics Corporation. For example, "SUPERWOOL 607" contains 60 to 70 mass % of $SiO_2$, 25 to 35 mass % of CaO, 4 to 7 Mass % of MgO, and a slight amount of $Al_2O_3$. "SUPERWOOL 607 MAX" contains 60 to 70 mass % of $SiO_2$, 16 to 22 mass % of CaO, 12 to 19 mass % of MgO, and a slight amount of $Al_2O_3$.

The biologically soluble fiber can have various average diameter and average length. For example, commercial fibers have an average fiber diameter within the range from about 0.05 to 15 μm. In particular, as the biologically soluble fiber, a fiber having the average fiber diameter within the range of 0.1 to 10 μm can suitably be used. The average length in the longer axial direction is preferably 10 to 600 μm, more preferably 50 to 400 μm. When the average length in the longer axial direction is below 10 μm, sometimes elasticity cannot be imparted. On the other hand, when it is above 600 μm, applicability may decrease.

The biologically soluble fibers are contained in the honeycomb-forming slurry at a ratio of preferably 1 to 80 mass %, more preferably 10 to 50 mass %, particularly preferably 20 to 40 mass % with respect to the whole constituents except for water.

(ii) Inorganic Binder

The inorganic binder contains a colloidal oxide having modified silica sol. In addition, for example, alumina sol may be contained besides silica sol.

It is preferable that the inorganic binder has a pH value of 4 to 11. When the pH value is below 4, there is a case that characteristics such as flowability are changed with the passage of time due to a metal ion extricated from the metal oxide contained in the biologically soluble fibers. Incidentally, the "pH value" in the present specification is measured in an aqueous solution at 25° C. and can be measured by using a measuring device such as for example, "D-51S" (trade name) produced by HORIBA, Ltd.

(Modified Silica Sol)

The modified silica sol is manufactured by adding a substance containing amine or an aqueous solution of a water-soluble metalate of an amphoteric metal to silica sol. An example of the modified silica sol manufactured by adding a substance containing amine is described in U.S. Pat. No. 2,601,352 specification. In addition, it can be manufactured, for example, by treating colloidal silica with a lower alkyl quaternary ammonium ion. By thus adding a substance containing amine to silica sol, the silica solid content is covered with an amine compound. Therefore, aggregation of silica sol by the influence of a metal ion extricated from a metal oxide contained in the biologically soluble fiber can be inhibited, and change with the passage of time of flowability or the like of the honeycomb-forming slurry can be inhibited.

Incidentally, a "substance containing amine" here means a compound obtained by substituting one or more hydrogen atom(s) of ammonia by a hydrocarbon radical and a substance containing an ammonium ion. Examples of the compound obtained by substituting one or more hydrogen atom(s) of ammonia by a hydrocarbon radical include methylamine, ethylamine, propylamine, and diethylamine. Examples of the substance containing an ammonium ion include a quaternary ammonium ion compound represented by a salt of tetrapropylammonium, tetraethylammonium, and tetrabutylammonium.

An example of modified silica sol manufactured by adding an aqueous solution of a water-soluble metalate of an amphoteric metal to silica sol is described in U.S. Pat. No. 2892797 specification. Alternatively, commercial "SNOWTEX CM" (trade name) produced by Nissan Chemical Industries, Ltd., may be used. By thus adding an aqueous solution of a water-soluble metalate of an amphoteric metal to silica sol, the dual layers of silica particles having an anionic site hardly changes by the pH value and the electrolyte content. Therefore, aggregation of silica sol by the influence of a metal ion extricated from a metal oxide contained in the biologically soluble fiber can be inhibited, and change with the passage of time of flowability or the like of the honeycomb-forming slurry can be inhibited.

Incidentally, the "amphoteric metal" here means a metal whose oxides react with an acid and a base, and examples include aluminum (Al), zinc (Zn), lead (Pb) and tin (Sn).

The silica solid content of the modified silica sol has an average particle diameter of 10 to 80 nm, more preferably 15 to 60 nm, particularly preferably 20 to 40 nm. When the average particle diameter is below 10 nm, gelation is easily caused to cause change in flowability or the like of the honeycomb-forming slurry with the passage of time. On the other hand, when it is above 80 nm, adhesibility tends to decrease.

The inorganic binder is contained in the honeycomb-forming slurry at a ratio of preferably 5 to 70 mass %, more preferably 10 to 50 mass %, particularly preferably 20 to 40 mass % with respect to the whole constituents except for water.

(iii) Inorganic Particle Component

Examples of the inorganic particle component include ceramics such as a silicon carbide particle, a silicon nitride particle, cordierite, alumina, and mullite. Of these, it is preferable to contain silicon carbide particles. When silicon carbide particles are contained in the inorganic particle component, the silicon carbide particles are contained at a ratio of preferably 1 to 80 mass %, more preferably 10 to 60 mass %.

As the silicon carbide particle, the numeral average particle diameter is 0.5 to 500 μm, more preferably 1 to 100 μm, particularly preferably 1.5 to 50 μm. When the numeral average particle diameter is below 0.5 μm, silicon carbide particles are prone to move upon drying the honeycomb-forming slurry, which may cause a heterogeneous structure. On the other hand, when it is above 500 μm, imparting elasticity may be difficult. Incidentally, the numeral average particle diameter of the silicon carbide particles is measured according to JIS R 1629.

As the cordierite, a cordierite powder having a tap bulk density of 1.30 $g/cm^3$ or more. When the tap bulk density is below 1.30 $g/cm^3$, a defect such as crack generation or peeling may easily be caused. From the viewpoint of more effectively inhibiting a defect such as crack generation or peeling from being caused, the tap bulk density of the cordierite powder is preferably 1.34 g/cm$^3$ or more, more preferably 1.39 g/cm$^3$ or more.

When an inorganic particle component is contained in the honeycomb-forming slurry, the component is contained in the honeycomb-forming slurry at a ratio of preferably 1 to 80 mass %, more preferably 10 to 60 mass %, particularly preferably 20 to 50 mass % with respect to the whole constituents except for water.

(iv) Organic Binder

Examples of the organic binder include polyvinyl alcohol (PVA), carboxymethyl cellulose (CMC), and methyl cellulose (MC). They have the effects in stabilizing viscosity of the honeycomb-forming slurry and imparting strength in a drying step.

When the organic binder is contained in the honeycomb-forming slurry, the organic binder is contained in the honeycomb-forming slurry at a ratio of preferably 0.01 to 5 mass %, more preferably 0.05 to 3 mass %, particularly preferably 0.1 to 2 mass % with respect to the whole constituents except for water.

1.2 Outer Peripheral Coat Layer

The outer peripheral coat layer 9 is a layer disposed on the outer peripheral face of the periphery-ground article. Though the outer peripheral coat layer 9 may be formed by the use of conventionally known outer peripheral coat material slurry, it is preferable to form the layer by the use of honeycomb-forming slurry. This is because crack generation in the outer peripheral coat layer 9 can be inhibited. Incidentally, the honeycomb-forming slurry may contain conventionally known outer peripheral coat material slurry.

About the honeycomb-forming slurry, the same thing can be said as described in the aforementioned "honeycomb-forming slurry".

2. Method for Manufacturing the First Honeycomb Structure

The first honeycomb structure can be manufactured by bonding a plurality of honeycomb segments at an outer wall of each of them with a bonding layer to obtain a honeycomb structure, grinding an outer peripheral portion of the cell structure to form a periphery-ground article, and disposing an outer peripheral coat layer on the outer peripheral face of the periphery-ground article.

2.1 Method for Manufacturing Cell Structure

Figure 4:
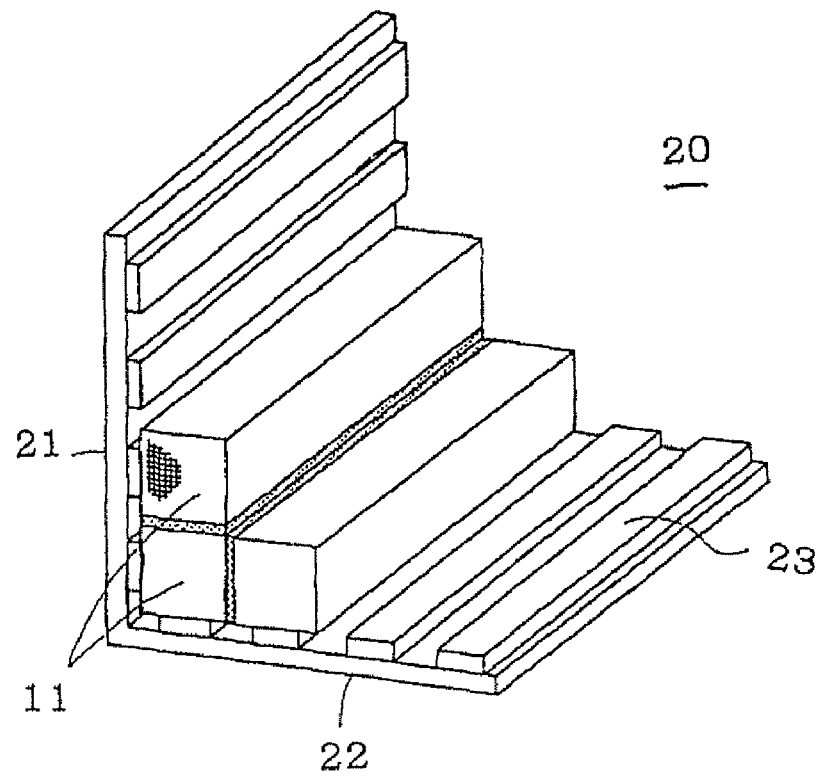
FIG. 4 is a perspective view showing a method for disposing honeycomb segments using a disposition jig.

The cell structure can be manufactured by bonding a plurality of honeycomb segments at an outer wall of each of them with a bonding layer. An example of the method for forming a bonding layer is described in JP-A-2000-279729. More specifically, using a disposition jig 20 having two planes (the first plane 21 and the second plane 22) meeting at a right angle as shown in FIG. 4, pasty honeycomb-forming slurry is applied on an outer wall of each of the honeycomb segments 11 on the disposition jig 20, the honeycomb segments are arranged in parallel with the first plane 21 and the second plane 22 in predetermined positions, pressure is applied, and the slurry is dried to form a bonding layer. Incidentally, a pad 23 brought in to contact with the honeycomb segments 11 may be provided on the first plane 21 and the second plane 22 as necessary.

(1) Method for Manufacturing Honeycomb Segment

The honeycomb segment can be manufactured by a conventionally known method. More specifically, to a material for constituting porous partition walls are added a binder such as methyl cellulose, hydroxypropoxyl cellulose, hydroxyethyl cellulose, carboxymethyl cellulose, and polyvinyl alcohol, a pore former, a surfactant, water as a solvent, and the like; they are kneaded to prepare kneaded clay having plasticity; the kneaded clay is formed into a columnar shape; drying the formed article; plugging portions are formed in the cells; and firing the article to obtain the honeycomb segment.

The kneading method, the method for forming the kneaded clay into a columnar shape, and the drying method are not particularly limited. As the kneading method, there is a method using a kneader or a vacuum kneader. As the method for forming the kneaded clay into a columnar shape, there may be employed a conventionally known forming method such as extrusion forming, injection forming, and press forming. Of these, preferable is a method of extrusion forming using a honeycomb structure-forming die capable of imparting desired outer wall thickness, partition wall thickness, and cell density to the kneaded clay. Further, as a drying method, there may be employed a conventionally known drying method such as hot air drying, microwave drying, dielectric drying, reduced pressure drying, vacuum drying, and freeze drying. Of these, it is preferable to employ a drying method of a combination of hot air drying with microwave drying or dielectric drying in that the whole article can be dried quickly and uniformly. The drying conditions can suitably be selected according to the material constituting the porous partition walls and the like.

As a method for forming plugging portions in the cells, a conventionally known method can be employed. More specifically, after a sheet is adhered on the end face, holes are made in positions corresponding with the cells where plugging portions are formed of the sheet. At the state that the sheet is adhered, and the end face is immersed in plugging slurry to fill the slurry into the opening end portions of the cells where the plugging portions are to be formed, followed by drying and firing. Incidentally, the plugging slurry means a slurried plugging material. The plugging is preferably performed by the use of the same material as that for constituting the porous partition walls in order to reduce thermal expansion difference between the plugging portions and the porous partition walls.

As a firing method, for example, there is a method where firing is performed in a firing furnace. The firing furnace and the firing conditions can suitably be selected according to the shape, material, and the like of the honeycomb structure. Organic matter such as a binder may be combusted and removed by calcination before firing. Incidentally, though the firing may be performed before the plugging slurry is filled or after the plugging slurry is filled, the firing is preferably performed after the plugging slurry is filled. This is because carbon dioxide generated and the costs in the thermal treatment step or the like can be reduced by reducing the number of the thermal treatment steps for one time.

(2) Method for Preparing Honeycomb-Forming Slurry

The honeycomb-forming slurry can be prepared by, for example, adding, as necessary, a dispersant, water, and the like to predetermined constituents and mixing and kneading them by the use of a kneader such as a mixer to obtain slurry (paste).

2.2 Method for Manufacturing Periphery-Ground Article

The periphery-ground article can be manufactured by grinding an outer peripheral portion of the cell structure obtained above. There is no particular limitation on the grinding method, and a conventionally known method can be employed. For example, a method described in Japanese Patent No. 2604876 official bulletin. More specifically, it is preferable to set a peripheral speed of the grinding stone to 750 to 2100 m/min., preferably 1300 to 1500 m/min., and a machining speed of 0.7 to 0.9 mm/sec. When the peripheral speed of the grinding stone is below 750 m/min., time required for the grinding is long, which may raise the production costs unnecessarily. On the other hand, when the peripheral speed of the grinding stone is above 2100 m/min., chipping may be caused to fail to obtain desired size accuracy. When the machining speed is below 0.7 mm/sec., machining time may increase. On the other hand, when it is above 0.9 mm/sec., chipping may be caused to shorten the life of the grinding stone.

2.3 Method for Manufacturing the First Honeycomb Structure

The first honeycomb structure can be manufactured by disposing an outer peripheral coat layer on the outer peripheral face of the periphery-ground article. There is no particular limitation on the method for disposing the outer peripheral coat layer, and a conventionally known method may be employed. For example, the outer peripheral coat layer can be formed by coating the outer peripheral face with the honeycomb-forming slurry, followed by firing.

II. Second Honeycomb Structure

The second honeycomb structure is provided with a periphery-ground article formed by grinding outer peripheral portion of a cell structure having a plurality of cells separated and formed by porous partition walls, and an outer peripheral coat layer.

1. Constituent of the Second Honeycomb Structure 1.1 Periphery-Ground Article

The periphery-ground article is obtained by grinding an outer peripheral portion of the cell structure 13. The shape of the outer peripheral portion due to grinding is not particularly limited and may arbitrarily be formed in accordance with the shape of the second honeycomb structure. Incidentally, the outer peripheral portion to be ground is preferably for two cells or more from the outermost peripheral cell, more preferably for to 2 or 4 cells. By grinding the cell structure 13 in this manner, deformed cells present in the outer peripheral portion can be removed.

(Cell Structure)

The cell structure 13 has a plurality of cells 14 separated and formed by the porous partition walls 15, where the cells 14 have plugging portions in such a manner that one end face 6 and the other end face 7 show complementary checkerwise patterns.

The cell structure 13 has a cell density of preferably 50 to 400 cpsi (7.7 to 62.0 cells/cm$^2$), more preferably 70 to 370 cpsi (10.8 to 57.3 cells/cm$^2$), particularly preferably 80 to 320 (12.4 to 49.6 cells/cm$^2$). When the cell density is below 50 cpsi (7.7 cells/cm$^2$) the strength may be low. On the other hand, when it is above 400 cpsi (62.0 cells/cm$^2$), the engine output may be reduced due to too high pressure loss.

(1) Porous Partition Wall

Regarding the porous partition walls 15 of the cell 13, the same thing as described in the above "porous partition wall" can be said.

(2) Cell

Regarding the cells 14 of the cell structure 13, the same thing as described in the above "cell" can be said.

1.2 Outer Peripheral Coat Layer

The outer peripheral coat layer 9 is a layer disposed on the outer peripheral face of the periphery-ground article and is formed by the use of honeycomb forming slurry. Therefore crack generation in the outer peripheral coat layer 9 can be inhibited. Incidentally, the honeycomb-forming slurry may contain conventionally known outer peripheral coat material slurry.

Regarding the honeycomb-forming slurry, the same thing as described in the above "honeycomb-forming slurry" can be said.

2. Method for Manufacturing the Second Honeycomb Structure

The second honeycomb structure can be manufactured by obtaining a honeycomb structure having plurality of cells separated and formed by porous partition walls and plugged in such a manner that one end face and the other end face show complementary checkerwise patterns, grinding an outer peripheral portion of the cell structure to form a periphery-ground article, and disposing the outer peripheral coat layer on the outer peripheral face of the periphery-ground article.

2.1 Method for Manufacturing Cell Structure

There is no particular limitation on the method for manufacturing the cell structure, and the cell structure can be manufactured by a conventionally known method. More specifically, to a material for constituting porous partition walls are added a binder such as methyl cellulose, hydroxypropoxyl cellulose, hydroxyethyl cellulose, carboxymethyl cellulose, and polyvinyl alcohol, a pore former, a surfactant, water as a solvent, and the like; they are kneaded to prepare kneaded clay having plasticity; the kneaded clay is formed into a columnar shape; the formed article is dried; plugging portions are formed in the cells; and the article is fired to obtain the cell structure.

The kneading method, the method for forming the kneaded clay into a columnar shape, and the drying method are not particularly limited, and the methods described in the above "method for manufacturing the first honeycomb structure" can be employed.

2.2 Method for Manufacturing Periphery-Ground Article

The periphery-ground article can be manufactured by grinding an outer peripheral portion of the cell structure obtained above. There is no particular limitation on the grinding method, and the method described in the above "method for manufacturing the first honeycomb structure" can be employed.

2.3 Method for Manufacturing the Second Honeycomb Structure

The second honeycomb structure can be manufactured by disposing an outer peripheral coat layer on the outer peripheral face of the periphery-ground article. There is no particular limitation on the method for disposing the outer peripheral coat layer, and the method described in the above "method for manufacturing the first honeycomb structure" can be employed.

EXAMPLE

Hereinbelow, the present invention will specifically be described on the basis of examples. However, the present invention is by no means limited to these examples. Incidentally, "%" in Examples and Comparative Examples is based on mass unless otherwise noted. The method for measuring various property values and the method for evaluating the properties are shown below.

[pH value]: measured at 25° C. in aqueous solution

[Flowability of slurry]: Slurry kneaded until it had flowability was put in a cylindrical container having a diameter of 50 mm and a height of 100 mm from the bottom up to the height of 50 mm and statically left for 24 hours. Then, the container was tilted at an angle of 135°, and evaluation was given by eye-observing the state after 10 seconds.

Excellent: The slurry fell off from the mouth of the container.

Good: The slurry flowed to the position of 90 mm or more from the bottom of the container.

Fair: The slurry flowed to the position below 90 mm and 65 mm or more from the bottom of the container.

Bad: The slurry flowed to the position below 65 mm from the bottom of the container.

[Crack generation in outer peripheral coat layer]: Observation was performed by a microscope to give evaluations of "present" for the honeycomb structures having any crack and "absent" for the honeycomb structures having no crack.

[Bonding strength (MPa)]: Ten bonding layers of a honeycomb structure were prepared as the samples, and three point bending bond-strength was measured according to JIS R 1601. The average was calculated.

Example 1

There were employed 28.5% of magnesium silicate fibers as the biologically soluble fibers, 30% of an aqueous solution of colloidal oxide having a pH value of 9.2 and a silica solid content of 10%, which was adjusted by the use of and a modified silica sol obtained by adding an aqueous solution of a water-soluble metalate of an amphoteric metal to silica sol, as the inorganic binder, 40% of a silicon carbide powder as the inorganic particle component, 0.5% of carboxymethyl cellulose as the organic binder, and 1% of clay to obtain honeycomb-forming material (1). The honeycomb-forming material (1) was kneaded for 30 minutes with a mixer to prepare pasty honeycomb-forming slurry (1) (hereinbelow referred to as "slurry (1)"). The pH value of the slurry (1) right after the preparation was 9.5, the pH value when 24 hours passed after the preparation was 9.7, and the evaluation for the flowability was "excellent". Incidentally, the average particle diameter of the silica solid content was 40 nm.

Example 2

The honeycomb-forming material (2) was obtained in the same manner as in Example 1 except for employing an aqueous solution of a colloidal oxide having a pH value of 10.0 as the inorganic binder and employing a modified silica sol manufactured by adding a substance containing amine to prepare pasty honeycomb-forming slurry (2) (hereinbelow referred to as "slurry (2)"). The evaluation results of the slurry (2) are shown in Table 1. Incidentally, the average particle diameter of the silica solid content was 37 nm.

Example 3

The honeycomb-forming material (3) was obtained in the same manner as in Example 1 except for employing an aqueous solution of a colloidal oxide having a pH value of 9.4 as the inorganic binder to prepare pasty honeycomb-forming slurry (3) (hereinbelow referred to as "slurry (3)"). The evaluation results of the slurry (3) are shown in Table 1. Incidentally, the average particle diameter of the silica solid content was 52 nm.

Example 4

The honeycomb-forming material (4) was obtained in the same manner as in Example 1 except for employing an aqueous solution of a colloidal oxide having a pH value of 9.2 as the inorganic binder to prepare pasty honeycomb-forming slurry (4) (hereinbelow referred to as "slurry (4)") The evaluation results of the slurry (4) are shown in Table 1. Incidentally, the average particle diameter of the silica solid content was 22 nm.

Example 5

The honeycomb-forming material (5) was obtained in the same manner as in Example I except for employing an aqueous solution of a colloidal oxide having a pH value of 9.3 as the inorganic binder to prepare pasty honeycomb-forming slurry (5) (herein below referred to as "slurry (5) "). The evaluation results of the slurry (5) are shown in Table 1. Incidentally, the average particle diameter of the silica solid content was 15 nm.

Example 6

The honeycomb-forming material (6) was obtained in the same manner as in Example 1 except for employing an aqueous solution of a colloidal oxide having a pH value of 3.6 as the inorganic binder to prepare pasty honeycomb-forming slurry (6) (hereinbelow referred to as "slurry (6)"). The evaluation results of the slurry (6) are shown in Table 1. Incidentally, the average particle diameter of the silica solid content was 42 nm.

Example 7

The honeycomb-forming material (7) was obtained in the same manner as in Example 2 except for employing an aqueous solution of a colloidal oxide having a pH value of 3.6 as the inorganic binder to prepare pasty honeycomb-forming slurry (7) (hereinbelow referred to as "slurry (7) "). The evaluation results of the slurry (7) are shown in Table 1. Incidentally, the average particle diameter of the silica solid content was 40 nm.

Comparative Example 1

The honeycomb-forming material (8) was obtained in the same manner as in Example 1 except for employing an aqueous solution of a colloidal oxide having a pH value of 8.8 as the inorganic binder and employing silica sol subjected to no treatment to prepare slurry (8). The evaluation results of the slurry (8) are shown in Table 1. Incidentally, the average particle diameter of the silica solid content was 17 nm.

Comparative Example 2

The honeycomb-forming material (9) was obtained in the same manner as in Example 1 except for employing an aqueous solution of a colloidal oxide having a pH value of 3.6 as the inorganic binder to prepare slurry (9). The evaluation results of the slurry (9) are shown in Table 1. Incidentally, the average particle diameter of the silica solid content was 40 nm.

TABLE 1

| | Silica sol | Average particle diameter of silica solid content (mm) | pH value of inorganic binder | Slurry Kind | pH value right after preparation | pH value after 24 hours from preparation | Flowability after 24 hours from preparation |
|---|---|---|---|---|---|---|---|
| Example 1 | Solution | 40 | 9.2 | (1) | 9.5 | 9.7 | Excellent |
| Example 2 | Substance | 37 | 10.0 | (2) | 10.1 | 10.3 | Excellent |
| Example 3 | Solution | 52 | 9.4 | (3) | 9.6 | 9.8 | Excellent |
| Example 4 | Solution | 22 | 9.2 | (4) | 9.4 | 9.8 | Good |
| Example 5 | Solution | 15 | 9.3 | (5) | 9.4 | 9.6 | Good |
| Example 6 | Solution | 42 | 3.6 | (6) | 6.5 | 7.4 | Fair |
| Example 7 | Substance | 40 | 3.6 | (7) | 6.7 | 7.3 | Fair |
| Comp. Ex. 1 | Ordinary | 17 | 8.8 | (8) | 8.7 | 9.6 | Bad |
| Comp. Ex. 2 | Ordinary | 40 | 3.6 | (9) | 6.5 | 7.8 | Bad |

Note:
Regarding silica sol, "solution" denotes a modified silica sol manufactured by adding an aqueous solution of a water-soluble metalate of an amphoteric metal to silica sol, "substance" denotes a modified silica sol manufactured by adding a substance containing amine to silica sol, and "ordinary" denotes ordinary silica sol.

The slurries (1) to (5) had good flowability even after 24 hours from the preparation. The slurries (6) and (7) had a slight change in flowability with passage of time as pH changed after 24 hours from the preparation. On the other hand, the slurries (8) and (9) had a change in flowability with passage of time.

Example 8

The bonding layer and the outer peripheral coat layer were formed by using the pasty slurry (1) prepared in Example 1 to manufacture a honeycomb structure. Crack generation in the outer peripheral coat layer of the honeycomb structure was "absent", and the bonding layer of the honeycomb structure manufactured by using the slurry (1) right after the preparation as the bonding material had a bonding strength of 3.9 MPa, and the bonding layer of the honeycomb structure manufactured by using the slurry (1) after 24 hours from the preparation as the bonding material had a bonding strength of 3.8 MPa.

Examples 9 to 14 and Comparative Examples 3 and 4

Each of the honeycomb structures was manufactured in the same manner as in Example 8 except for employing pasty slurry shown in Table 2. The evaluation results of the honeycomb structures manufactured are shown in Table 2.

TABLE 2

| | Kind of slurry | Crack generation | Bonding strength right after preparation (MPa) | Bonding strength after 24 hours from preparation (MPa) |
|---|---|---|---|---|
| Example 8 | (1) | Absent | 3.9 | 3.8 |
| Example 9 | (2) | Absent | 3.7 | 3.9 |
| Example 10 | (3) | Absent | 2.9 | 2.9 |
| Example 11 | (4) | Absent | 4.2 | 4.0 |
| Example 12 | (5) | Absent | 4.3 | 4.0 |
| Example 13 | (6) | Absent | 1.5 | 1.2 |
| Example 14 | (7) | Absent | 1.7 | 1.4 |
| Comp. Ex. 3 | (8) | Present | 3.7 | 2.1 |
| Comp. Ex. 4 | (9) | Present | 1.7 | 0.5 |

Each of the honeycomb structures manufactured by using pasty honeycomb-forming slurry hardly had a crack in the outer peripheral coat layer, and there was no large influence on bonding strength of the bonding layer with passage of time.

A honeycomb structure of the present invention can be used as a filter for exhaust gas. For example, the honeycomb structure can suitably be used for a diesel particulate filter (DPF) for trapping and removing particulate matter (PM) contained in exhaust gas from a diesel engine or the like.

What is claimed is:
1. A honeycomb structure comprising:
   a periphery-ground article obtained by grinding an outer peripheral portion of a cell structure where a plurality of honeycomb segments are bonded by means of a bonding layer at an outer wall of each of them, and
   an outer peripheral coat layer disposed on an outer peripheral face of the periphery-ground article;
   wherein at least one of the bonding layer and the outer peripheral coat layer is formed by the use of honeycomb-forming slurry containing (1) biologically soluble fibers containing a metal oxide capable of extricating a metal ion and (2) an inorganic binder containing a colloidal oxide having modified silica sol, the modified silica sol being manufactured by adding a substance containing amine or an aqueous solution of a water-soluble metalate of an amphoteric metal to silica sol, wherein each biologically soluble fiber has an alkali metal oxide content that is greater than 0 and less than or equal to 2% by mass of the biologically soluble fiber, wherein the inorganic binder has a pH value of 4 to 11 at 25° C. and wherein a silica solid content of the modified silica sol has an average particle diameter of 10 to 80 nm.

2. The honeycomb structure according to claim 1, wherein the silica solid content of the modified silica sol has an average particle diameter of 20 to 40 mn.

3. The honeycomb structure according to claim 2, wherein the inorganic binder comprises 20 to 40 mass % of the honeycomb-forming slurry on a dry basis.

4. The honeycomb structure according to claim 3, wherein the biologically soluble fibers comprise 20 to 40 mass % of the honeycomb-forming slurry on a dry basis.

5. A honeycomb structure comprising:

a periphery-ground article formed by grinding an outer peripheral portion of a cell structure having a plurality of cells separated and formed by porous partition walls, and an outer peripheral coat layer disposed on an outer peripheral face of the periphery-ground article;

wherein the outer peripheral coat layer is formed by the use of honeycomb-forming slurry containing (1) biologically soluble fibers containing a metal oxide capable of extricating a metal ion and (2) an inorganic binder containing a colloidal oxide having modified silica sol, the modified silica sol being manufactured by adding a substance containing amine or an aqueous solution of a water-soluble metalate of an amphoteric metal to silica sol, wherein each biologically soluble fiber has an alkali metal oxide content that is greater than 0 and less than or equal to 2% by mass of the biologically soluble fiber, wherein the inorganic binder has a pH value of 4 to 11 at 25° C., and wherein a silica solid content of the modified silica sol has an average particle diameter of 10 to 80 nm.

6. The honeycomb structure according to claim 5, wherein the silica solid content of the modified silica sol has an average particle diameter of 20 to 40 nm.

7. The honeycomb structure according to claim 6, wherein the inorganic binder comprises 20 to 40 mass % of the honeycomb-forming slurry on a dry basis.

8. The honeycomb structure according to claim 7, wherein the biologically soluble fibers comprises 20 to 40 mass % of the honeycomb-forming slurry on a dry basis.

* * * * *